May 9, 1967 K. SCHLESINGER 3,319,110
ELECTRON FOCUS PROJECTION AND SCANNING SYSTEM
Filed May 12, 1966 8 Sheets-Sheet 1

INVENTOR:
KURT SCHLESINGER,
BY James J. Lichiello
HIS ATTORNEY.

INVENTOR:
KURT SCHLESINGER,
BY James J. Lichiello
HIS ATTORNEY.

FIG. 9A. HORIZONTAL SWEEP PER PLATE ANODE VOLTAGE

| | ELECTRO-STATIC YOKE DIAGONAL d | SWEEP DIAGONAL Δ | YOKE PROFILE |
|---|---|---|---|
| a | 0.50" | .420 | CYLINDER |
| b | 0.75" | .625 | CYLINDER |
| c | 0.75" | .625 | CONE |

INVENTOR:
KURT SCHLESINGER,
BY James J. Lichiello
HIS ATTORNEY.

INVENTOR:
KURT SCHLESINGER,
BY James J. Lichiello
HIS ATTORNEY.

INVENTOR:
KURT SCHLESINGER,
BY James J. Lichiello
HIS ATTORNEY.

INVENTOR:
KURT SCHLESINGER,

# United States Patent Office 3,319,110
Patented May 9, 1967

3,319,110
ELECTRON FOCUS PROJECTION AND
SCANNING SYSTEM
Kurt Schlesinger, Fayetteville, N.Y., assignor to General
Electric Company, a corporation of New York
Filed May 12, 1966, Ser. No. 554,276
35 Claims. (Cl. 315—17)

This application is a continuation-in-part of copending application Ser. No. 309,151, Schlesinger, Electron Focus Projection and Scanning System, filed Sept. 16, 1963, and assigned to the same assignee as the present application.

This invention relates to improved systems for focusing and deflecting electron beams, and more specifically, to electron optical systems of the focus projecting scanning kind, otherwise denoted as an FPS system.

Modern applications for electron beam tubes often require high image resolution, high beam current density, with minimum power requirements, size, and weight. For example, beam tubes having these characteristics are useful as automatic celestial guidance sensors for aerospace systems. With respect to vidicon type pickup camera tubes, an optimum design requirement may be a high performance tube having a target of about one inch diameter or smaller, with a minimum tube length as well. The high resolution and high beam current density requirements necessitate a large convergence or half-angle at the target, which implies a short beam length for beam diameters of manageable size. However, adequate scansion of the target area limits the degree to which a tube may be shortened to obtain the desired short beam length. Conventional optical systems employing lumped fields to effect deflection after focusing are unable to meet these requirements since they require a physically long structure. In these systems, a long narrow beam profile with small half-angles at the target is inevitable. Small half-angles and long beam lengths introduce fundamental limitations on beam current and resolution. All-electrostatic and all-magnetic electron optical systems are unable to meet these requirements since the former is inherently a long beam system and the latter is bulky, heavy, and requires a large amount of power.

It is desirable in an electron optical system that a beam proceeding on a given axis and deflected therefrom approach and strike the target orthogonally. Prior art deflection systems introduce radial velocity components as the beam is deflected and, hence, the beam does not land normal to the target.

In accordance with this and the above-cited copending application, it is an object of the invention to provide an improved electron optical system for focusing and deflecting an electron beam.

It is another object of the invention to provide an electron optical system permitting both high resolution and high beam current density with deflection over a substantial proportion of the available envelope diameter.

It is another object of the invention to provide an electron optical system in a beam tube wherein the electron beam is deflected over a substantial proportion of the available envelope diameter with minimum edge-defocusing and scan distortion.

It is an object of this invention to provide an improved mixed field system for focusing and deflecting an electron beam.

It is another object of this invention to provide a mixed field system which provides automatic collimation of an electron beam.

It is another object of this invention to provide an FPS mixed field electron optical system which eliminates the need for collimation after the FPS cavity to correct electron beam landing conditions.

It is a further object of this invention to provide a mixed field electron optical system wherein an electron beam, after deflection, automatically emerges in a path substantially parallel to its original path so as to enable orthogonal landing on the target.

It is still another object of this invention to provide an improved mixed field electron optical system with a non-rotating magnetic lens.

It is another object of this invention to provide an FPS mixed field system in which the plane of deflection of the electron beam is not rotated from the direction of the electrostatic field.

In one preferred form of this invention the electron optical system comprises an envelope having a substantially coaxial electrostatic yoke and solenoid extending along the envelope intermediate a beam source and a target. The solenoid generates a substantially uniform magnetic field within and along the axis of the envelope, while the electrostatic yoke generates a variable, electric field, substantially uniform within the envelope and orthogonal to the magnetic field. The electric field can simultaneously cause deflection of the beam along two coordinates of the system. The crossed electric and magnetic fields constitute a "focus projection and scanning" or "FPS" cavity in the central portion of the envelope. The target, which may be lying in a plane perpendicular to the envelope axis, is spaced from one boundary of the FPS cavity. The electron beam source including a cross over or an aperture forming an object to be imaged on a target is located ahead of the FPS cavity. A pre-focus lens may be positioned between the aperture and the entrance to the FPS cavity. The FPS cavity focuses a projected electron image of the system object onto the target while simultaneously deflecting the image across the target area in accordance with the signals applied to the electrostatic yoke. In applications where near normal landing conditions are required, the system is adjusted so that the transit time of the beam through the cavity causes the dwell phase of the beam to be in its third or fourth quadrant of operation.

While the specification concludes with claims particularly pointing out and distinctly claiming the subject matter of this invention, the following description of the invention, taken in conjunction with the accompanying drawings, should be referred to for better understanding of the manner and process of making and using this invention.

FIGS. 9A and 9B are graphical illustrations of the change in the ratio of sweep voltage-to-anode voltage for particular raster diagonals with a change in the length of the FPS cavity;

Figure 12:
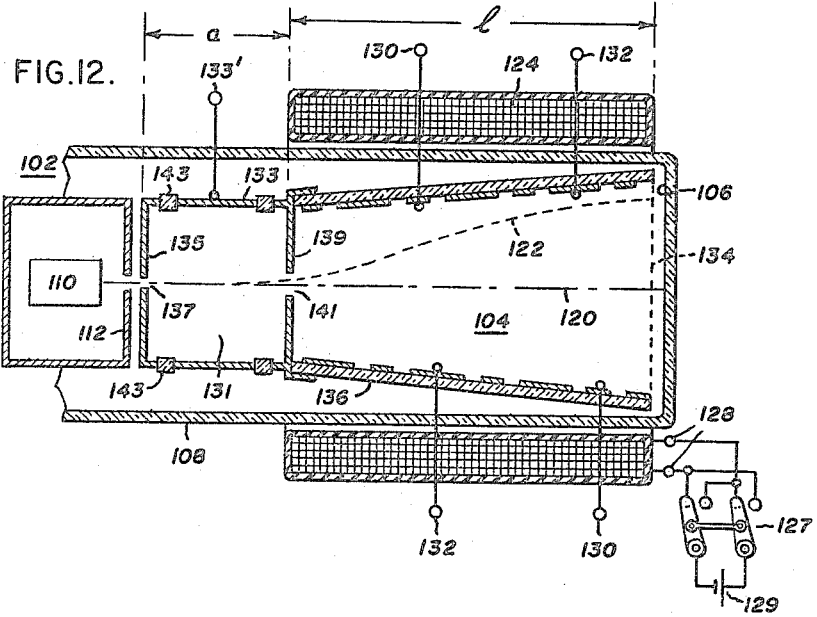
FIG. 12 is a sectional view along the length of another embodiment of an FPS electron beam tube having a partially immersed electron beam.
Figure 13A:
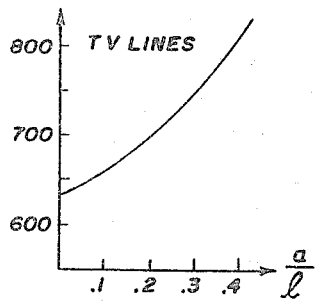
Figure 13B:
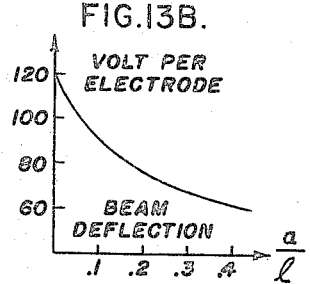
Figure 13C:
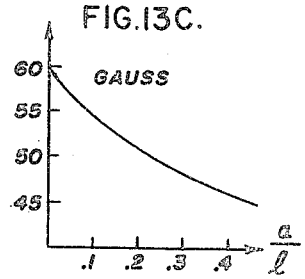
Figure 13D:
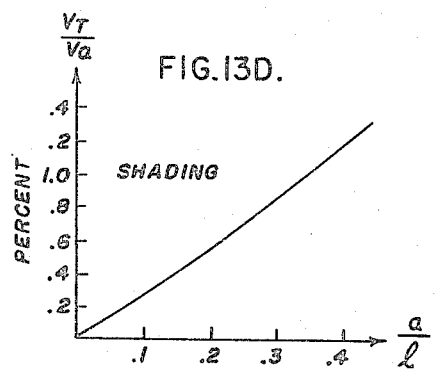
Figure 14A:
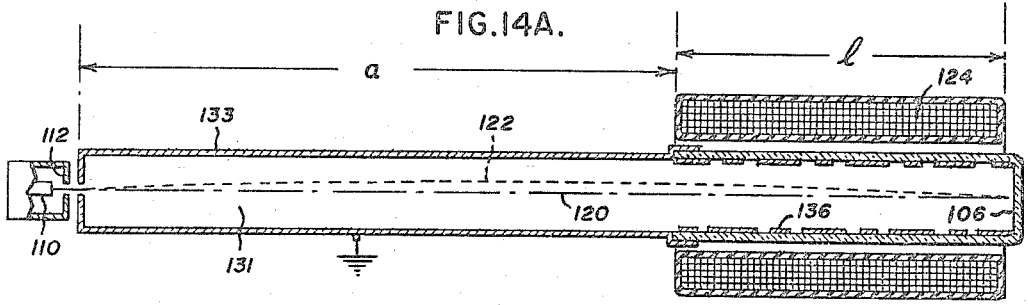
Figure 14B:
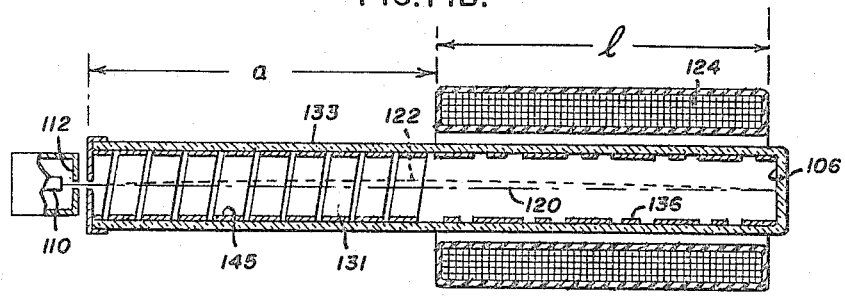
Figure 15:
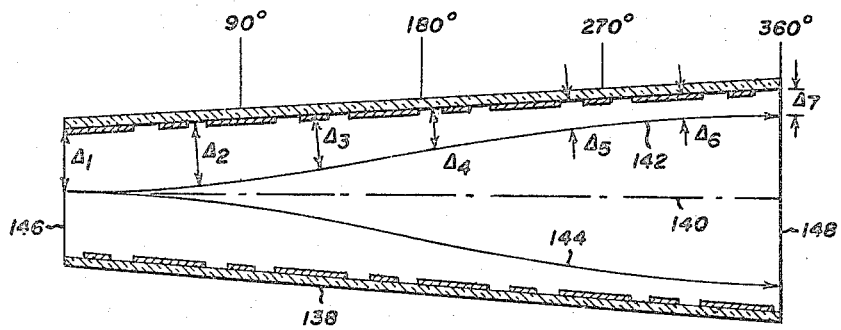
Figure 16A:
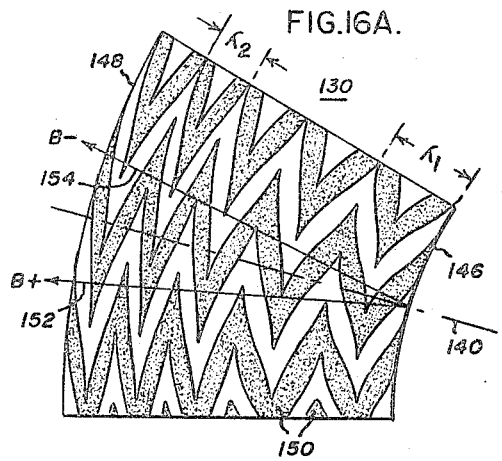
Figure 16B:
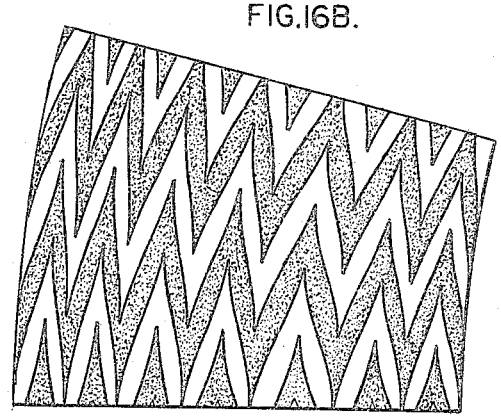
Figure 17:
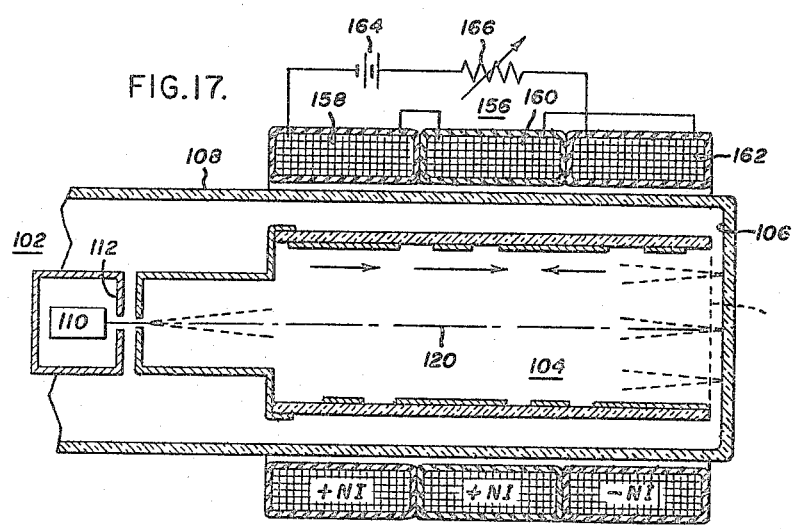
Figure 18:
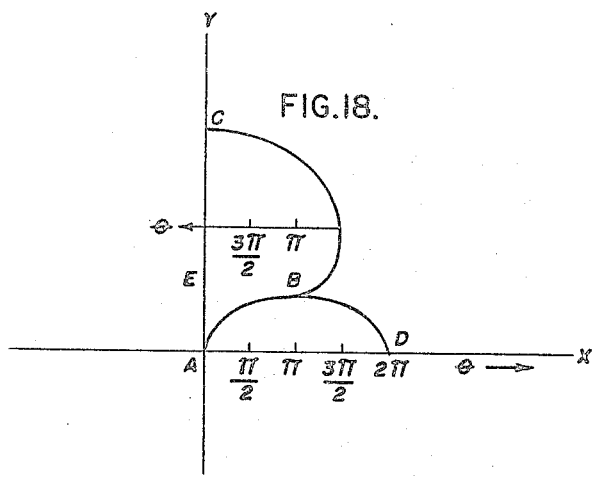

FIGS. 13A, 13B, 13C, and 13D are graphical illustrations of the characteristics of the FPS electron beam tube shown in FIG. 12;

FIGS. 14A and 14B are sectional views along the length of two other embodiments of an FPS electron beam tube having a partially immersed electron beam;

FIG. 15 is a sectional view taken along the longitudinal axis of an electrostatic deflection in an FPS system;

FIG. 16a shows the leaf electrode pattern for an FPS deflectron;

FIG. 16b shows another embodiment of the leaf electrode pattern;

FIG. 17 shows another embodiment of this invention wherein the FPS system uses a non-rotating magnetic lens;

FIG. 18 is a graphical illustration of the electron beam path in the $x-y$ plane of the embodiment shown in FIG. 17.

Figure 1:
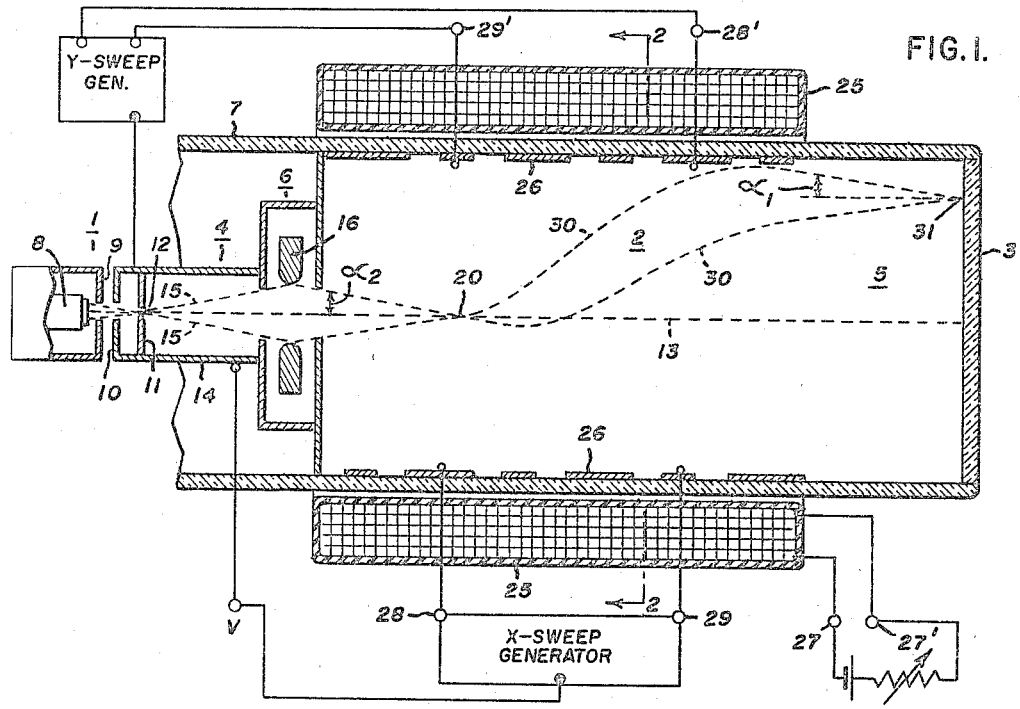
FIG. 1 is a sectional view along the length of one embodiment of an electron beam tube incorporating the electron focus projection and scanning system of this invention.

With reference to FIG. 1, the electron optical system of the invention comprises generally an electron beam source 1, a focus projection and scanning or FPS cavity 2, and a target 3 positioned within an elongated envelope 7 with drift spaces 4 and 5 separating electron beam source 1 and target 3 respectively from FPS cavity 2. A pre-focus lens 6 may be positioned within drift space 4.

Electron beam source 1 includes a large area thermionic cathode 8, the emission of electrons from cathode 8 being controlled by grid electrode 9. The emitted electrons are accelerated by anode electrode 10 which is maintained at an appropriate positive potential with respect to cathode 8. An electrode member 11 having a defining aperture 12 formed therein is positioned adjacent anode 10. The aforementioned electrodes are energized from appropriate potential sources (not shown). A beam cross-over occurs at defining aperture 12, the defining aperture serving as the real object of the electron optical system of the invention. The diameter of aperture 12 should be comparable to the desired spot size, e.g., about 0.2 mil. Aperture 12 is substantially coincident with axis 13 of envelope 7. Member 11 is mounted in a barrel or cylinder 14 which defines the drift space between the aperture or real object 12 and the FPS cavity 2. The dashed lines identified by reference numeral 15 indicate the profile of the beam within the drift space 4. Anode 10 and barrel 14 are maintained at the same potential V which determines the beam energy.

Pre-focus lens 6, positioned within drift space 4, may be employed to control the beam profile within drift space 4, i.e., the paths of the electrons as they travel toward target 3. Pre-focus lens 6, in the embodiment shown, comprises an electrostatic Einzel lens 16 energized from an appropriate potential source (not shown). Lens 16 may be employed to converge and focus the electron beam at a point 20 within FPS cavity 2 thereby forming a real image of defining aperture 12 within the cavity. By controlling the electric field generated by lens 16, the converging effect of lens 16, and hence the distance within cavity 2 at which focus point 20 occurs, may be controlled. Lens 16 may also be energized to render the electron beam divergent as it enters FPS cavity 2. In this mode of operation, described in greater detail with reference to FIG. 4, lens 16 produced no focus point or real image of defining aperture 12 within the FPS cavity but produces a virtual image of aperture 12.

The FPS cavity comprises the central portion of envelope 7 and is formed by solenoid 25 and electrostatic yoke 26. As used in the specification, the term "central portion" means that portion or longitudinal part of the envelope 7 extending between the drift spaces 4 and 5. Solenoid 25 is positioned over the exterior surface of envelope 7, surrounding and axially extending along the central portion of the envelope. Solenoid 25 is energized from an appropriate power supply (not shown) connected to terminals 27 and 27'. Solenoid 25 generates a uniform magnetic field parallel to axis 13 within the central portion of envelope 7. A permanent magnet may also be used in place of solenoid 25 to provide a similar magnetic field.

Figure 2:
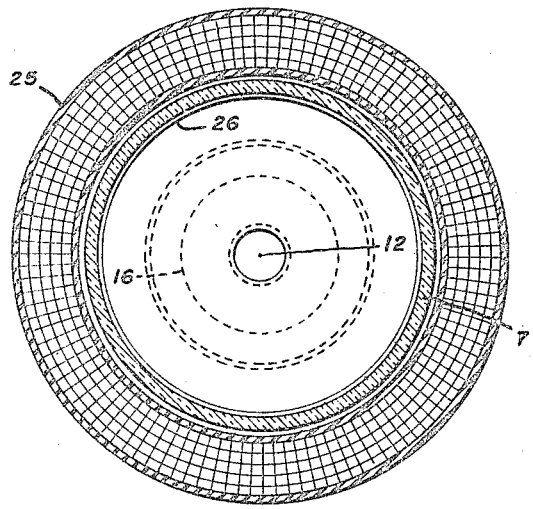
FIG. 2 is a cross section of the electron beam tube of FIG. 1 taken along the plane 2—2 in FIG. 1.

Electrostatic yoke 26 is preferably of the type which will provide simultaneous horizontal and vertical deflection forces on the beam, for example, a system employing pairs of interleaved horizontal and vertical deflection electrodes. Electrostatic yoke 26 is attached or formed on the interior surface of envelope 7, by plating, coating, et cetera, and extends along the central portion of envelope 7 coextensive with solenoid 25. FIG. 2, which is a cross section taken along plane 2—2 of FIG. 1, illustrates the location of solenoid 25 and electrostatic yoke 26 relative to envelope 7. Electrostatic yoke 26 generates, in response to appropriate energization at terminals 28 and 28' and 29 and 29', a rotatable, bi-axial, electric field orthogonal to the magnetic field generated by solenoid 25 and substantially uniform over the volume of FPS cavity 2. The electric field must be essentially transverse, i.e., free of any components along axis 13 which would tend to provide defocusing and rotational effects. Solenoid 25 and electrostatic yoke 26 thus generate crossed electric and magnetic fields which are substantially coextensive within the central portion of envelope 7 to form FPS cavity 2. The magnetic field is static whereas the electric field is dynamic, varying in accordance with the deflection signals applied to terminals 28, 28', 29 and 29'.

The target or screen 3 is positioned at the end of envelope 7 opposite electron beam source 1 and lies in a plane substantially perpendicular to axis 13. Target 3 is separated from FPS cavity 2 by drift space 5.

The focus projection and scanning system of the invention may be used in many cathode ray devices and for many applications. For example, the FPS system may be employed in high beam intensity micro-spot tubes, monochrome or color television projection systems, vidicon or image orthicon tubes, X-ray tubes, or high-power focused-beam tubes for electron machining, welding, or contour drilling. Consequently, the nature of target 3 will vary. In the beam tube illustrated in FIG. 1, target 3 is a conventional target capable of producing a visible image upon impingement of an electron beam thereon. However, in any of the applications, target 3 is spaced from the FPC cavity by drift space 5, as previously described.

In accordance with one mode of operation of the electron focus projection and scanning system of the invention, to be described with reference to FIG. 1, the electron beam diverges as it emerges from defining aperture 12 and progresses through drift space 4 toward FPS cavity 2. Pre-focus lens 6 causes the beam to converge and refocus at point 20 within FPS cavity 2. The crossed electric and magnetic fields within FPS cavity 2 cause the electrons of the beam to follow generally cycloidal paths within the cavity. The length of one cycloid may be measured by the distance between focus points of the beam. The deflection signals applied to terminals 28, 28′, 29 and 29′ of electrostatic yoke 26 determine the direction and magnitude of deviation of the electrons from axis 13. Dashed lines 30 indicate the boundaries of one of the theoretical beam paths within the cavity. For this path, a full cycloid is not performed by the beam within the cavity, i.e., focus point 20 is not repeated within the cavity. However, as a result of the forces acting on the electrons within FPS cavity 2, the electrons converge in drift space 5 to a sharp focus 31 on target 3. The half-angle $\alpha$, at the target 3, which is substantially the same as half-angle $\alpha_2$ at focus point 20, is large and may be, for example, six times greater than the half-angle attainable in a conventional optical system of the same length. High resolution and high beam current density may therefore be obtained without severely limiting the proportion of the available envelope diameter over which the beam may be deflected. In this mode of operation, the focus at point 20 is thus projected forward by the action of the FPS cavity 2 to target 3.

Figure 3:
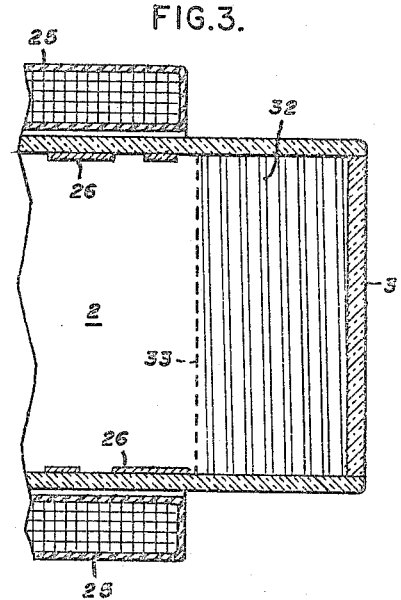
FIG. 3 is a partial sectional view illustrating an accelerating or decelerating electrode in an electron beam tube incorporating the focus projection and scanning system of this invention.

The projected focus is a real focus and may be accelerated or decelerated in the drift space between the FPS cavity and the target. For example, acceleration or deceleration may be effected by a suitably energized coaxial cylindrical spiral of uniform pitch formed on the walls of the envelope in the drift space between the cavity and the target, such as shown at 32 in FIG. 3. A mesh electrode 33 may be provided to terminate the field due to spiral electrode 34.

Figure 4:
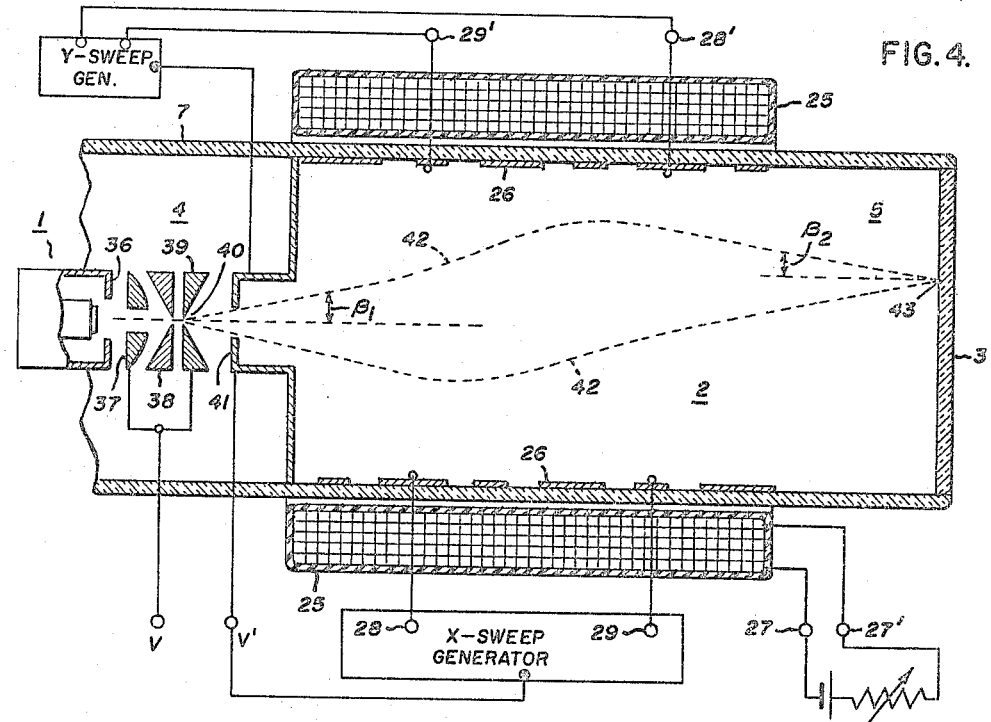
FIG. 4 is a sectional view along the length of a second embodiment of an electron beam tube incorporating the electron focus projection and scanning system of this invention.

The beam tube of FIG. 4 illustrates a second mode of operation of the focus projection and scanning system of the invention, viz. the diverging mode. In the FIG. 1 embodiment, the electron beam in drift space 4 was caused to converge as it entered the FPC cavity 2 and the electrons were brought to a focus 20 within the cavity to form a real image of the defining aperture. This focus was projected upon and scanned across the surface of target 3 by means of the crossed electric and magnetic fields of the cavity. In the mode of operation illustrated by the beam tube of FIG. 4, the primary focus lies outside of the cavity, rather than being projected into it, and the electron beam entering the cavity is diverging rather than converging. This mode thus employs a virtual image of the defining aperture. However, projection of the primary focus to the target and deflection across the surface of the target is obtained through the action of the crossed electric and magnetic fields in the FPS cavity, as in the mode illustrated in FIG. 1.

The components of the beam tube of FIG. 4 which are common to the FIG. 1 embodiment are identified with the same reference numerals in order to facilitate description. Thus, the beam tube of FIG. 4 comprises an envelope 7, an electron beam source 1, mounted at one end of the envelope, a target 3 mounted at the opposite end of the envelope, and an FPS cavity 2, comprising crossed electric and magnetic fields generated by coextensive solenoid 25 and electrostatic yoke 26, in the central portion of envelope 7. Drift spaces 4 and 5 separate beam source 1 and target 3 respectively from FPS cavity 2.

The portion of the beam tube illustrated in FIG. 4 differing from the FIG. 1 embodiment is the electron beam source which provides a diverging, rather than a converging, beam for the FPS cavity. With reference to FIG. 4, electron beam source 1 comprises a large area cathode 35, an apertured collimating electrode 36, an anode 37, a control grid or gate electrode 38, and a meniscus electrode 39. Meniscus electrode 39 has a defining aperture 40 formed therein which serves as the real object in the electron optical system of the invention. A lens 41 having pre-focusing properties is positioned in drift space 4 adjacent FPS cavity 2. The electron beam source illustrated is of the type disclosed and claimed in U.S. Patent 2,995,676, Schlesinger, and assigned to the same assignee as the present invention.

In accordance with the second mode of operation of the electron focus projection and scanning system of the invention, the electron beam diverges as it emerges from defining aperture 40 and progresses through drift space 4 toward FPS cavity 2. The beam continues to diverge as it enters the cavity, rather than converging as in the FIG. 1 embodiment. The half-angle $B_1$ of divergence may be adjusted by means of pre-focus lens 41.

The outline of a theoretical path of the electron beam is illustrated by dashed lines 42. The diverging half-angle $B_1$ at which the electron beam enters FPS cavity 2 is substantially equal to the converging half-angle $B_2$ at which the electrons enter drift space 5 and are focused at point 43 on target 3. In the path illustrated by lines 42, the beam performs only one cycloid from the defining aperture or real object 40 to point 43 on target 3.

The cyclotron frequency $\Omega$ of the electrons within the FPS cavity of FIGS. 1 and 4 is expressed as $$\Omega = \eta B \qquad (1)$$

where $\Omega$ = cyclotron frequency
$\eta$ = ratio of electron charge to electron mass
$B$ = magnetic field strength in gauss within FPS cavity The dwell time $T$ of the electrons within the FPS cavity is expressed by the equation $$T = \frac{l}{\sqrt{2\eta V}} \qquad (2)$$

where $l$ = length of FPS cavity
$V$ = beam voltage

The cyclotron phase $\theta$ is expressed as $$\theta = \Omega T = \sqrt{\frac{\eta}{2}} \frac{Bl}{\sqrt{V}} = .292 \frac{Bl}{\sqrt{V}} \qquad (3)$$

For an FPS cavity of given length, the cyclotron phase $\theta$ and the focus can be adjusted by changing either the magnetic field $B$ or the beam voltage $V$ or both, as an alternative to varying the energization of pre-focus lenses 6 and 41 illustrated in FIGS. 1 and 4 respectively.

The total deflection of the electron beam within the FPS cavity along the $x$ and $y$ axes is given by the equations $$x = x_0 + \frac{\dot{x}_0 + \frac{E}{B}}{\Omega} \sin \theta - \frac{\dot{y}_0}{\Omega}(1 - \cos \theta) - \frac{E}{B}T \qquad (4)$$

$$y = y_0 + \frac{\dot{y}_0}{\Omega} \sin \theta + \frac{\dot{x}_0 + \frac{E}{B}}{\Omega}(1 - \cos \theta) \qquad (5)$$

where $x_0$, $\dot{x}_0$, and $y_0$, $\dot{y}_0$ are the position and velocity coordinates at the cavity entrance and $E$ is the electric field strength. The deflection $D$ at the cavity exit is thus given by $$D = \sqrt{x^2 + y^2} \qquad (6)$$

Deflection sensitivity, or the ratio of the deflection $D$ in the FPS cavity obtained with a given deflection voltage to the deflection $D_0$ obtained in an all-electrostatic system with the same deflection voltage, is expressed as $$\frac{D}{D_0} = \sqrt{\frac{1 + 2\frac{1 - \cos \theta}{\theta 2} - 2\frac{\sin \theta}{\theta}}{\theta/2}} \qquad (7)$$

The angle of rotation $\rho$ of an electron image within the FPS cavity is given as $$\rho = \tan^{-1}\left(\frac{y}{x}\right) = \tan^{-1}\left(\frac{\theta - \sin \theta}{1 - \cos \theta}\right) \qquad (8)$$

Figure 5A:
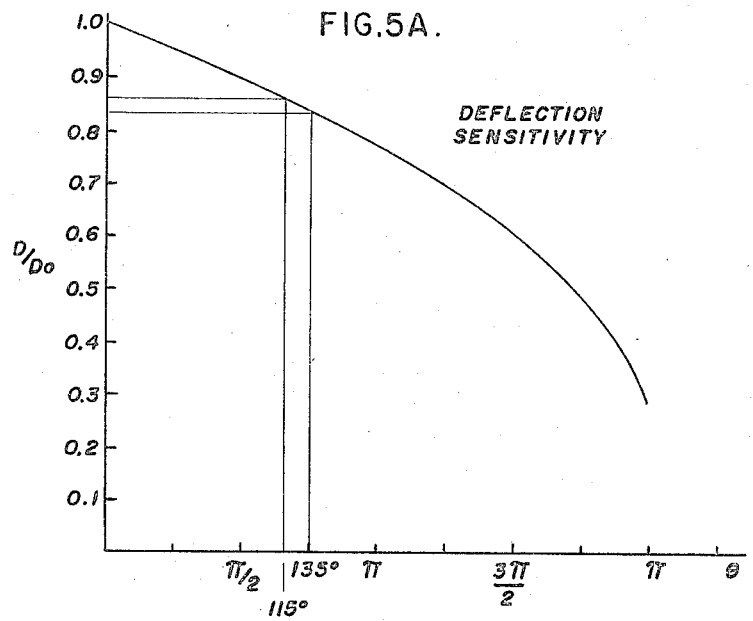
FIGS. 5A and 5B are graphical illustrations of the characteristics of the electron focus projection and scanning system of the invention.
Figure 5B:
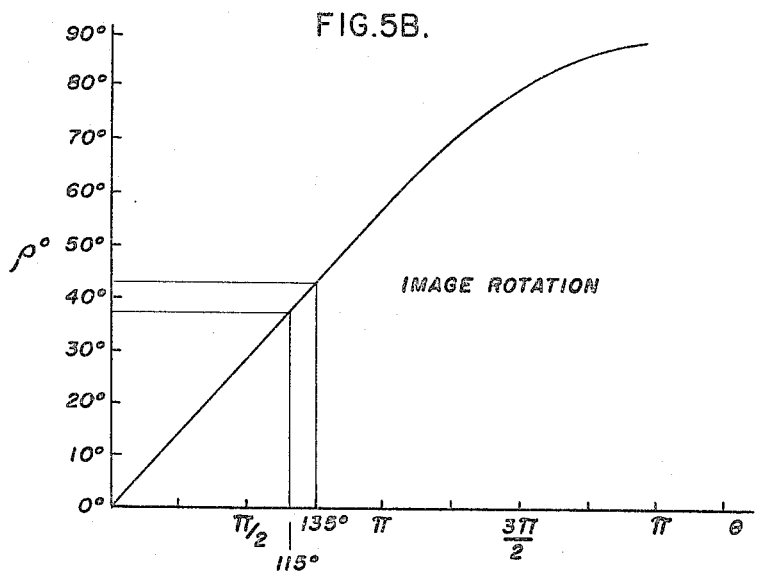

These characteristics of the FPS system of the invention are illustrated in FIGS. 5A and 5B. FIG. 5A shows the deflection sensitivity of the system as a function of cyclotron phase. FIG. 5B illustrates image rotation in the FPS system of the invention as a function of cyclotron phase. Image rotation is approximately one-third of cyclotron phase.

Optimum anastigmatic FPS operation has been achieved with cyclotron phases between 110° and 140°. Truly anastigmatic images are obtained at cyclotron phrases of 115° and 135°. As illustrated in FIGS. 5A and 5B, the deflection sensitivity and image rotation for a cyclotron phase of 115° are 86% and 38° respectively while for a cyclotron phase of 135° they are 83% and 43° respectively. The cyclotron phase angle of 135° exhibits the shorter focal length and is the preferred operating condition. At this phase angle, the electron beam performs 135° of its 360° cycloid within the FPS cavity. The required magnetic field strength for a cyclotron phase of 135° can be calculated from the Equation 3 as $$B = 3.33 \frac{\sqrt{V}}{l}\theta + 7.8 \frac{\sqrt{V}}{l} \qquad (9)$$

The relationship between the lengths of drift spaces 4 and 5 and cavity 2 is expressed by the equation $$b = \frac{a + l\frac{\sin\theta}{\theta}}{-\cos\theta} \qquad (10)$$

where
$a$ = length of drift space 4
$b$ = length of drift space 5
$l$ = length of FPS cavity 2

Since the denominator of Equation 10 is $-\cos\theta$, $b$ is positive, and hence the beam leaving the FPS cavity is converging, only if $\theta$ lies in the second or third quadrant. Since for preferred FPS operation, cyclotron phase $\theta$ is maintained between 110° and 140°, $b$ is positive and the condition for outward projection of a focus beyond the cavity is satisfied.

The focus projection and scanning system of the invention, illustrated in FIGS. 1 and 4 in different modes of operation, permits simultaneous deflection of the electron beam along both the horizontal and vertical axis of the target. In addition, scanning and focusing are accomplished simultaneously in the system of the invention. A shorter tube structure than heretofore obtainable in systems employing sequential scanning or sequential scanning and focusing may therefore be employed. Because of the simultaneous scanning and focusing in the system of the invention, the optical distance from the lens to the target may be shorter than the deflection structure whereas if scanning is performed after focusing, the optical distance from the lens to the target must be greater than the deflection structure. The shorter optical length between the lens and the target in the system of the invention permits the converging electron beam to have a larger half-angle at the target and therefore greater power density at the focus point on the target. The compromise between brightness and resolution in prior art beam tubes is thereby obviated.

The focus projection and scanning system of the invention conserves focus of the image during deflection over the surface of the target and can scan 83% of the tube diameter with very little edge defocusing and scan distortion. The adjustable pre-focus lens in the drift space adjacent the cavity input provides a means for exactly focusing the real object on the target. Alternately, the magnetic field strength or the beam voltage may be adjusted for this purpose.

The focus projection and scanning system of the invention employs no beam-intercepting apertures in the FPS cavity. Thus, minimum loss of beam current is experienced.

Figures 6, 7:
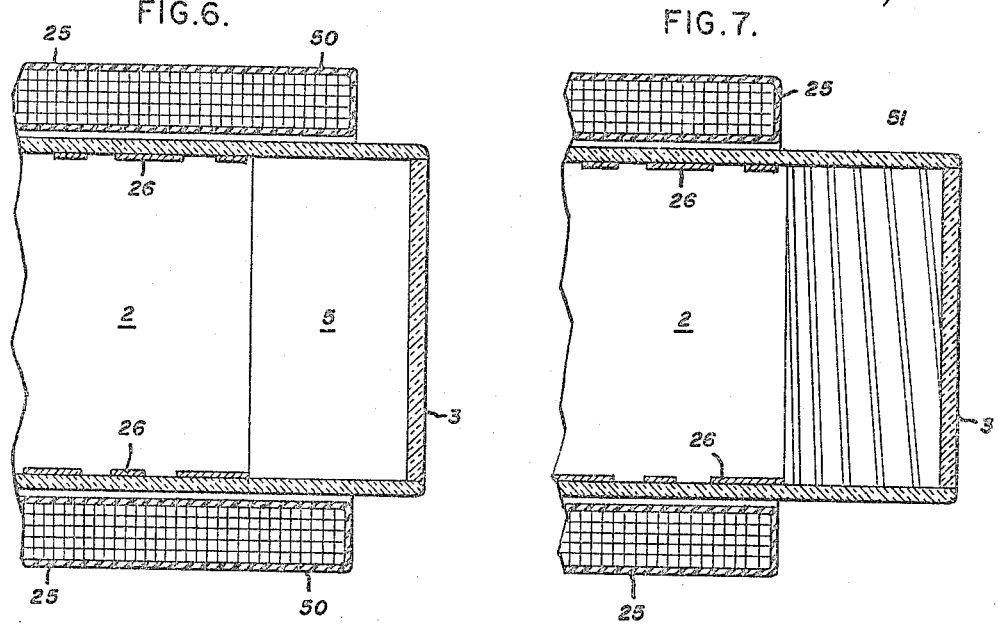
FIG. 6 is a partial sectional view of an electromagnetic collimation arrangement for use in an electron beam tube incorporating the focus projection and scanning system of the invention.
FIG. 7 is a partial sectional view of an electrostatic collimation arrangement for use in an electron beam tube incorporating the focus projection and scanning system of the invention.

Beam landing on the target is substantially orthogonal since the beam subjected to the crossed electric and magnetic fields in the FPS cavity emerges from the cavity after deflection in a path displaced from but parallel to the reference axis. Minor deviations may be corrected by post-accelerating the beam between the cavity and the target, as described with reference to FIG. 3. Post-cavity collimation is preferably effected magnetically by extending the solenoid beyond the FPS cavity, as indicated at 50 in FIG. 6, but may also be accomplished electrostatically by a suitably energized spiral lens 51 located in the drift space between the FPS cavity and the target, as shown in FIG. 7.

Thus, it will be evident that the present invention provides a system for projecting a focus point of an electron beam forward to a target to obtain high resolution and brightness while simultaneously permitting controlled deflection of the beam across the area of the target. Power requirements, size, and weight are minimized. The focus projection and scanning system of the invention is analogous to a short magnetic lens moving in a plane parallel to the target and projecting an image of the real object on the target, the lens serving to move the image in two dimensions on the target.

The focus projection and scanning system of the invention is a building block and has application in many types of electron beam apparatus, e.g., image orthicons, vidicons, electron beam machining, welding and contour drilling apparatus, projection television apparatus. With respect to primary color television tubes, it is important to note that the electron beam need not be on the central axis of the tube as it enters the FPS cavity. It may enter the cavity at a point radially spaced from the axis and will undergo cycloidal deflection and emerge from the cavity in a path parallel to the axis for ultimate orthogonal landing on the target. Thus, a plurality of independent beams can be passed through the FPS cavity simultaneously, each being simultaneously deflected in its own raster by the same deflecting field prior to impingement on color sensitive portions of the target.

As described above, there are particular advantages of operating an FPS system in its second quadrant with the dwell phase varying between 110° and 140°, in its weak focusing mode of operation. However, for some applications of the FPS system it has been found to be advantageous to operate with the dwell phase in its third and fourth quadrants, in its strong focusing mode of operation.

Figure 8:
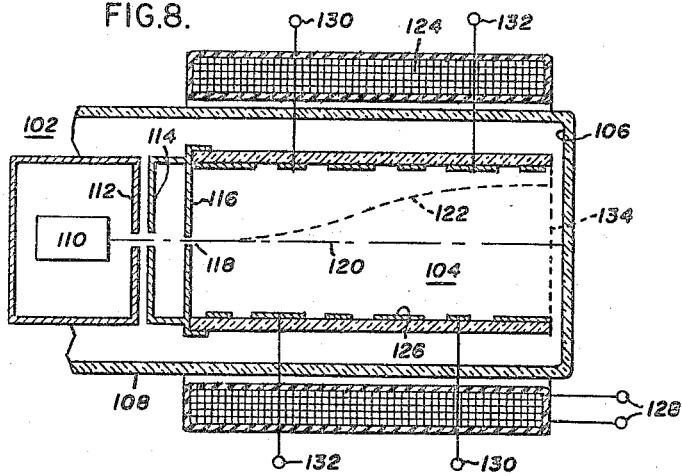
FIG. 8 is a sectional view along the length of one embodiment of the FPS electron beam tube in which the electron beam between the aperture and the target is fully immersed.

Referring now to FIG. 8, an FPS electron optical system is shown in which the focusing solenoid covers the entire system length. This system generally comprises an electron beam source 102, an FPS cavity 104, and a target 106 contained within an elongated envelope 108.

Electron beam source 102 includes a large area thermionic cathode 110 and a grid electrode 112 which controls the emission of electrons from the cathode 110. Emitted electrons are accelerated by an anode electrode 114 which is maintained at an appropriate positive potential with respect to the cathode 110. An electrode member 116 having a spot defining aperture or object aperture 118 of one mil or less formed therein is positioned adjacent the anode 114 at one end of the FPS cavity 104 so that there is no drift space between the electrode 116 and the FPS cavity. The aforementioned electrodes are energized from appropriate potential sources which are now shown. An electron beam cross over may occur at a defining aperture 118, or else the aperture may itself be made small enough to serve as the real object of the electron optical system. The aperture 118 is substantially coincident with axis 120 of the envelope 108. The dashed lines identified by reference numeral 122 define the principal ray of the electron beam for the case where the beam is focused from the aperture 118 to a substantially normal landing condition at the target 106.

The FPS cavity comprises the portion of the envelope 108 which is defined by crossed fields generated by a solenoid 124 and an electrostatic yoke 126. The solenoid 124 is positioned over the exterior surface of the envelope 108, surrounding and axially extending along this portion of the envelope. The solenoid 124 is energized from an appropriate power supply (not shown) connected to terminals 128. The solenoid 128 generates a uniform magnetic field parallel to the axis 120 within the FPS cavity 104. A permanent magnet may also be used in place of the solenoid 124 to provide a similar magnetic field.

The electrostatic yoke 126 is preferably of the type which provides a substantially uniform electric field which can deflect the beam along two coordinates of the system simultaneously and from a common center. This may be achieved by employing a printed circuit with pairs of interleaved horizontal and vertical deflection electrodes of a particular shape. The electrostatic yoke 126, which may be mounted within the interior surface of the envelope 108 in any convenient manner, is coextensive with the solenoid 124 to form the FPS cavity 104. In response to appropriate energization at terminals 130 and 132, the electrostatic yoke 126 generates a rotatable, biaxial, electrical field orthogonal to the magnetic field generated by the solenoids 124 and substantially uniform over the volume of the FPS cavity 104. The electric field must be essentially transverse, i.e., free of any components along the axis 120 which would tend to provide defocusing and rotational effects. The solenoid 124 and the electrostatic yoke 126 thus generate crossed electric and magnetic fields which are substantially coextensive and thereby forming the FPS cavity 104. The magnetic field is static, whereas the electric field is dynamic, varying in accordance with the deflection signals applied to the terminals 130 and 132.

A low resolution mesh 134 is positioned at the end of the FPS cavity 104, adjacent the target 106, to terminate the fields within the cavity. The target or screen 106 and the mesh 134 terminate the FPS cavity 104 so that the solenoid 124 covers the entire electron optical system length, leaving no field-free spaces at either side of the FPS cavity. The target 106 itself lies in a plane substantially perpendicular to the axis 120.

As described above, the focus projection and scanning system may be used in many cathode ray devices and for many applications. The FPS system may be employed in high beam intensity micro-spot tubes, monochrome or color television projection systems, vidicon and orthicon television camera tubes, X-ray tubes, or high-power focused-beam tubes for electron machining, welding, or contour drilling. Thus, the nature of the target 106 will vary. However, the tube shown in FIG. 8 is a vidicon in which the target 106 is of the type which is capable of producing a visible image upon impingement of an electron beam thereon. While the target 106 is immediately adjacent its end of the FPS cavity without an appreciable drift space between it and the cavity, this may not be desirable for some applications of this invention.

The expression for the cyclotron frequency $\Omega$ of the electrons within an FPS cavity is expressed in Equation 1, the dwell time T of the electrons within the FPS cavity is expressed in Equation 2, while the cyclotron phase $\theta$ is expressed in Equation 3. For an FPS cavity of given length $l$ in centimeters the cyclotron phase $\theta$ and the focus can be adjusted by changing either the magnetic field B in gauss or the beam voltage V or both. As an alternative, this invention discloses that focus can also be adjusted by varying the power of a separate weak pre-focus lens which may be located ahead of the FPS cavity.

Assuming that there is an electric field $\overline{E}_y$ is in the y-direction, the path equations of the electron beam within the FPS cavity are expressed by the equations, $$x = R(\theta - \sin\theta) \quad (11)$$
$$y = R(1 - \cos\theta) \quad (12)$$
$$z = l \cdot t/T \quad (13)$$

where $$R = \overline{E}_y / \Omega B \quad (14)$$

$t$ = flight time of an electron within the EPS cavity

The deflection D of the electron beam at the cavity exit is thus expressed in Equation 6. The deflection sensitivity or scan-compression ratio $k$, i.e., the ratio of deflection D obtained in the presence of a magnetic field to the deflection $D_0$ obtained in its absence, both with the same deflection voltage, is expressed in Equation 7. The angle of rotation $\rho$ of an electron image within the FPS cavity is given in Equation 8.

Figure 10:
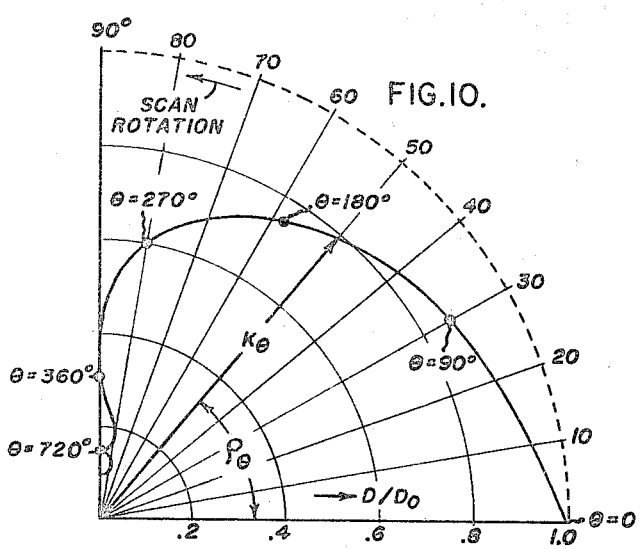
FIG. 10 is a graphical illustration of the relationship between the electrostatic deflectron and scan rotation of a beam with a change in the dwell phase of the FPS cavity.

These characteristics of the FPS system are illustrated in FIG. 10 wherein the functions $k$ and $\rho$ are plotted in polar coordinates. During the first three quadrants of the dwell phase $\theta$, scan rotation is the dominant effect of a change in the dwell phase, with scan compression amounting to no more than over 40% of the first three quadrants. During the fourth quadrant, however, scan rotation slows down, and scan deflection begins to drop off. From Equation 7 it can be seen that at $\theta = 360°$ scan compression is down to $1/\pi$ or 32% of its electrostatic value. The FPS cavity becomes strongly focusing. At $\theta = 360°$, where the FPS cavity becomes strong focusing, the scan-rotation is 90° and no longer changes with small variations of focus current which produce small changes in the dwell phase $\theta$. This is an important feature because it provides for the varying of focus current without undesirable image rotation.

Assuming that the FPS solenoid is the only electron lens in the FPS electron optical system, the focusing condition uniquely determines the dwell phase $\theta$ occurring in FPS cavity. Electron Trigonometry supplies the expression for focusing $$\pi = \frac{\theta}{2} + \tan^{-1}\left(\frac{a}{l} \cdot \frac{\theta}{2}\right) + \tan^{-1}\left(\frac{b}{l} \cdot \frac{\theta}{2}\right) \quad (15)$$

where $a$ = the length of any object drift space upstream of the FPS cavity
$b$ = the length of any image drift space downstream of the FPS cavity
$l$ = length of FPS cavity The system magnification M can thus be expressed by the equation $$M = \sqrt{\frac{1 + \left(\frac{b}{l} \cdot \frac{\theta}{2}\right)^2}{1 + \left(\frac{a}{l} \cdot \frac{\theta}{2}\right)^2}} \quad (16)$$

where $a = b$, M is unity for any value of $\theta$. When the target 106 is very close to the FPS cavity exit, $b = 0$ and the magnification M becomes $$M = \cos\theta/2 \quad (17)$$

Hence the system becomes demagnifying, especially where the FPS system is operated with $\theta$ in the third quadrant, and this feature is particularly desirable when a high-resolution electron optical system is desired.

Furthermore, the landing error $\beta$, defined as the angle between electron beam impact on a target and the normal-to-a-target is given by the expression $$\tan\beta = \frac{\sqrt{\dot{x}^2 + \dot{y}^2}}{\dot{z}} \text{ for } t = T \quad (18)$$

This expression can be evaluated by using the Equations 11, 12 and 13. This landing-error $\beta$ is undesirable in a camera tube since it causes shading effects of the type referred to as "port-hole effects."

In the present embodiment, the defining aperture 118 is immediately adjacent the cavity entrance. Therefore, referring to Equation 15, $a$ and $b$ are zero; $\theta = 2\pi$ or 360°. From Equation 18 it can be seen that the landing error $\beta$ is theoretically zero. Furthermore, Equation 17 shows that the magnification is unity for this condition once the FPS system has been brought into focus. The resolution is comparable to that of a conventional magnetic vidicon having the same target size and voltage.

Figure 11:
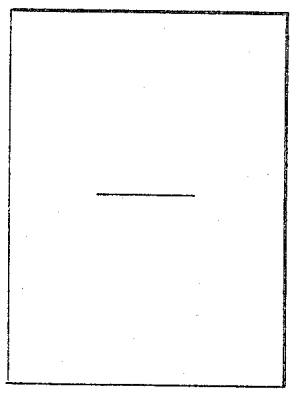
FIG. 11 is a pictorial illustration of the characteristics of the FPS system.
Figure 11:
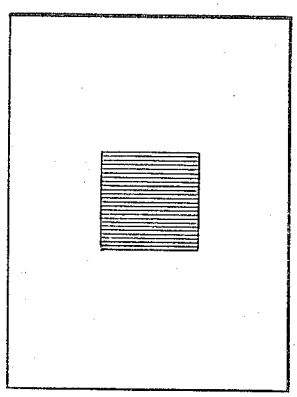
Figure 11:
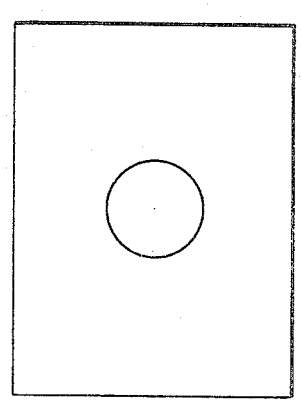
Figure 11:
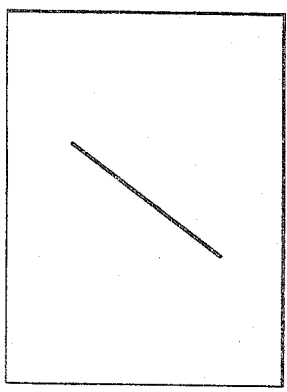
Figure 11:
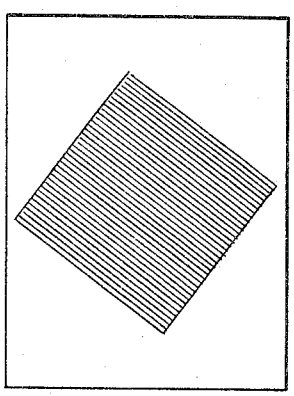
Figure 11:
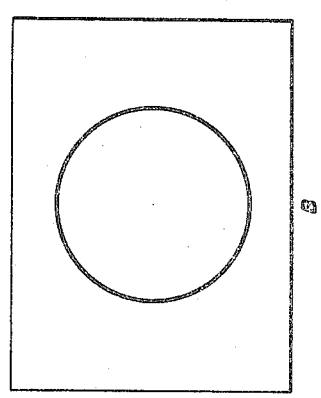
Figure 11:
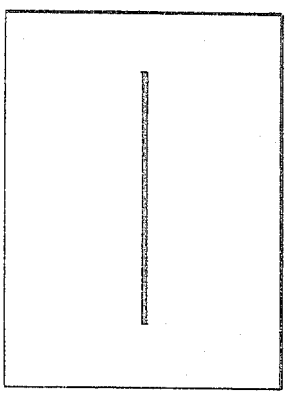
Figure 11:
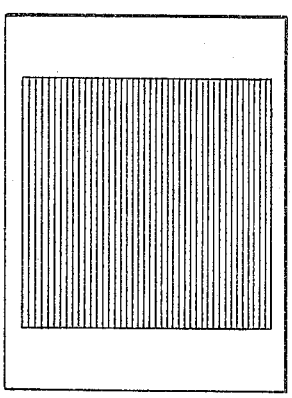
Figure 11:
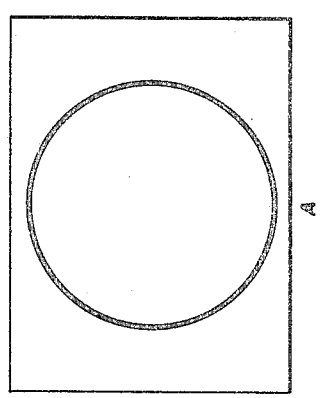

FIG. 11 shows the results of some tests using an FPS vidicon. Row 1 depicts scan rotation, row 2 depicts scan compression, and row 3 depicts scan resolution of an FPS vidicon having various modes of operation. These tests were made with a vidicon wherein the dwell phase $\theta$ can be varied from zero to 360°. Column A shows the operation of a vidicon where solenoid current equals zero and thus the dwell phase $\theta=0$, with electrostatic focus accomplished by an Einzel type lens, ahead of the FPS cavity. Column B represents the tests of a vidicon having a mixed-focus by an Einzel type lens and a solenoid such as shown in the above-cited application. The dwell phase $\theta$ is approximately 135°. Column C portrays an all-magnetic focus with the Einzel lens shorted out. Thus, the dwell phase $\theta=360°$. During all of these tests, the output-current remained constant.

Figure 9B:
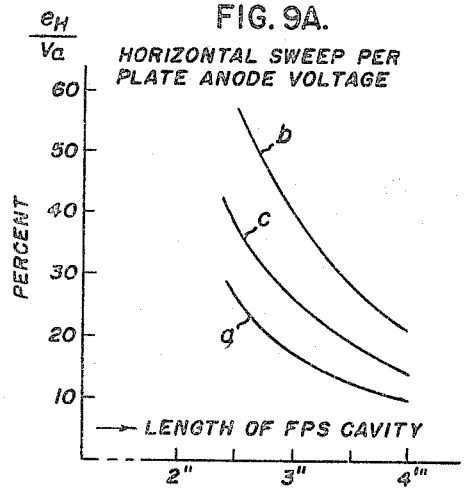

For some applications of the FPS electron optical system, a strong magnetic focusing system having a dwell phase $\theta$ of less than 360° may be more advantageous. Referring to FIG. 10, and to Equation 7, the deflection sensitivity $k$, or the ratio of deflection D with the magnetic field B on to the deflection $D_0$ with the magnetic field B off, increases as the dwell phase decreases from 360°. Furthermore, the sweep voltage $e_H$ needed for a vidicon having a given anode voltage $V_a$ is given by the deflection-percentage equation $$\frac{e_H}{V_a} = \frac{2.4 : \Delta : d}{l^2} = \frac{1}{K\theta} \qquad (19)$$

where $\Delta$=sweep-diagonal of the vidicon raster
$d$=the diameter of the electrostatic yoke or Deflectron
$K\theta$=scan compression by the magnetic field at some dwell phase
$l$=length of the deflection This equation is plotted in FIG. 9 for various lengths of the FPS cavity. The table shown in FIG. 9 gives the diameter $d$ and yoke size of which the graphs were plotted. Graph c shows that the use of a conical, rather than a cylindrical, yoke profile gives some relief from the high sweep voltage requirements of a larger diagonal raster. The results show that by using this strong magnetic focusing a minimum FPS cavity length of 3½ inches is required to keep deflection voltages at conveniently low levels.

The electron optical system shown in FIG. 12 may be advantageously utilized to increase the overall performance of the FPS systems. Basically, the system of FIG. 12 comprises a conical electrostatic deflection electrode 136 located within the solenoid 124 and of equal length $l$ therewith. Electrostatic deflection includes the advantage of being operative with only a small amount of electrical energy.

The terminals 128 of the solenoid 124 are connected through a double-pole, double-throw switch 127 to a battery 129 which energizes the solenoid. The switch 127 may be used to reverse the polarity of the magnetic field generated by the solenoid. This may be advantageous, as more fully explained below in conjunction with FIG. 8. As an alternative, a permanent magnet may also be used and may be physically turned to provide the preferred field polarity.

This system also includes an object distance or drift space 131 having a length shown as "$a$." An Einzel type lens 133 provides a means for fine focusing adjustment of the electron beam 122. An electrode 135 having a spot defining aperture 137 is located at one end of the drift space 131 adjacent the electrode 112. An electrode 139 having a beam defining aperture 141 is located at the other end of the drift space 131. The presence of the drift space 131, non-immersed in the FPS cavity, aids in reducing the dwell phase $\theta$ of the beam inside of the beam inside of the FPS cavity 104. The spot defining aperture 137 may have a diameter of 60 mil. Further-more, the electrodes 135 and 139 may be insulated from the Einzel type lens 133 and the conical deflection electrode 136 by insulating members 143.

The lens or cylinder 133 may be connected through a terminal 133' to a source of fine focusing voltage (not shown). For present purposes the fine focusing voltage does not differ much from the voltage at the anode electrodes 135 and 139, which may be interconnected. Electrostatic fine focusing does not produce the undesirable image rotation which occurs with magnetic fine focusing.

FIG. 13 is referred to for an analysis of the operation of an FPS vidicon tube shown in FIG. 12. The results are shown in FIG. 13 as functions of the ratio of the length of the drift space "$a$" to the length of the FPS cavity $l$ of a given length. Hence, data given for $a/l=0$ describes the performance of an FPS vidicon operating in the orthicon-mode, that is when the dwell phase $\theta=0$. FIG. 13A shows the resolution of a vidicon measured in television lines, FIG. 13B shows beam-deflection measured in voltage per electrode to obtain a prescribed beam deflection, FIG. 13C shows the strength of the magnetic field needed to focus the electron beam, and FIG. 13D shows the circular shading or "porthole effects" measured in noise voltage $V_T$ per anode voltage $V_a$. The most striking effects of the addition of the drift space 131 are the considerable gains in resolution, as shown in FIG. 13A, and the beam deflection economy, shown in FIG. 13B. The resolution increases from 620 television-lines-per-inch to 800 lines, and the deflection demand is cut in half. Furthermore, there is a saving in focusing power due to the marked reduction in magnetic field needed for focusing the electron beam, as shown in FIG. 13C.

In some instances the above advantages are attendant with some increase in shading signal $V_T$. This shading signal increases at a more than linear rate as the length "$a$" of the drift space 131 increases. However, experience has shown that the resulting circular shading is virtually unnoticeable in practice over the entire range of $a/l$ considered in FIG. 13.

The foregoing description, particularly that associated with resolution, indicates the greater advantages of practicing this invention with values of $\theta$ in the third quadrant of the FPS system of operation, for example at or about the point where the dwell phase $\theta=270°$.

For some applications of this invention where landing conditions are not a primary concern, systems in which the $a/l$ ratio does not conform with FIG. 13 may be of value. Thus the system in FIG. 14A, in which the $a/l$ ratio is 2, has been used for beam welders. A system such as that shown in FIG. 14B, wherein the effective length of "$a$" has been increased by a spiral winding 145 such as that described in Transactions of the I.R.E., vol. E.D. 9, #3, May 1962, may also be used.

FIG. 15 shows a type of electron beam deflection system which may be suitably employed in the FPS system. Within a glass tube blank 138, a conical electrostatic deflection electrode system is illustrated as having an axis 140 and a pair of electron beam paths 142 and 144. The electrons flow from an aperture end 146 of the blank 138 to a target end 148 of the blank. In FIG. 16 the electrostatic deflection system is developed into a plane to illustrate one example of a pattern of a printed circuit. The electrode leaves 150 may be printed as sinusoids or other types known in the art. In FIGS. 16 and 16B the wave length in the axial direction is not constant but is graded in such a manner that it is proportional to the proximity between beam and the yoke envelope. This kind of pattern is referred to as graded pitch geometry. The pitch is graded to avoid fringe field effects which occur when, as shown in FIG. 15, the electron beam approaches the wall carrying the electrostatic deflection electrodes. FIG. 16A shows the projection of three electron paths 152, 154, and 140, onto the plane of development of the electrostatic deflection electrode system. In the absence of a magnetic field, the electron beam follows the path 140. If, however, a magnetic field is present, the beam rotates as it is being deflected, following either the path 152 or the path 154, depending upon the polarity of the field. Within the electrostatic deflection field, the beam is affected by a force proportional to the integral with respect to time of the areas of alternating potential seen by it as it passes the printed electrodes. FIG. 16A shows that this charge integral is different along each of the paths 152 and 154 since each of the paths crosses different portions of the electrode leaves 150. If the beam path is far enough away from the wall, the force generated by the Deflectron is uniform, and the effects of the differences in beam paths can be ignored. However, this condition only occurs where there is sufficient space to house an electrostatic deflection system having its walls at least a prescribed distance away from the beam along the entire beam path. In many practical applications space is at a premium and the electrostatic deflection system must be as small as possible.

FIG. 15 is referred to with regard to a reason for having the pattern of the electrostatic deflection electrodes graded near the exit end. Studies of the fields within electrostatic deflection systems of the kind illustrated and described have shown that they are uniform within a large portion of the system starting from the axes. However, there is a fringe field area near the walls of the system where the field is not uniform. The depth of the fringe field varies in proportion to the wavelength $\lambda$ of the electrode leaves printed on the tube walls. If $\lambda^*$ is the depth of the fringe field, then the relationship between it and the wavelength $\lambda$ of the printed wall electrodes is:

$$\lambda^* = \lambda/2\pi \qquad (20)$$

Since the electrons in an FPS system built to minimize required space approach the wall of the electrostatic deflection system toward the exit or target end 148, the beam moves into the fringe area of the electrostatic deflection field. If the wavelength of the printed wall electrodes is varied, the fringe field moves closer the tube wall of the electrostatic deflection system and its effects are minimized.

Even where there is sufficient space to position an electrostatic deflection system of such a size that the polarity of the magnetic field has no appreciable effect upon the forces applied to the beam, one of the magnetic field polarities has been found more favorable than the other from a distortion standpoint. Thus, FIG. 12 shows a double pole, double throw switch 127 as a means for reversing the polarity of the field of the solenoid 120. The preferred polarity depends upon the direction which the wall electrode pattern follows at the start of the pattern. Thus, a pattern wound in a righthanded manner may have a preference for one polarity, for example a north polarity of the magnetic field, while a lefthand wound helix may have a preference for a magnetic field having the other polarity.

The dependency upon the polarity of the magnetic field is minimized if the beam enters the electrostatic deflection system or field in a path orthogonal to the first cycle of the printed wall electrode leaves, or as close to this condition as is practically possible. Thus, it is at times more advantageous to make the input wavelength of the electrostatic deflection field smaller than the wavelength of the printed wall electrodes in the middle portion of the electrostatic deflection system, particularly where the system must be mounted within a narrow envelope. FIG. 16A shows a configuration of this type. The printed wall electrodes of this system may have a graded pitch pattern wherein the wavelength of the printed wall electrode leaves is smaller at both ends and larger in the center portion, as illustrated in FIG. 16B. FIG. 16B also illustrates one embodiment of this invention where optimum results were desired from an extremely small electron deflection system. The wavelength of the printed wall electrode leaves was varied from one-half inch near the entrance end of the deflection system, to five-eighths of an inch nearer the center portion of the deflection system, to three-eighths of an inch at the exit or target end of the deflection system.

FIGS. 17 and 18 illustrate an embodiment of this invention in which an FPS electron optical system operates in a non-rotating (NR) mode. The structure of the electron beam source 102, the envelope 108, and the target 106 may be of any of the types disclosed above. However, the NR type of FPS system also includes a non-rotating magnetic lens 156 which in the present embodiment is shown, for illustrative purposes, as three similarly wound solenoid sections 58, 60 and 62 of equal length. Each of the solenoid sections in the non-rotating lens 56 has an equal number of turns. The non-rotating lens 156 is energized by a single current source comprising a battery 164 and a rheostat 166, by interconnecting the sections such that 58 and 60 are energized in opposition to 62. Since the same current flows through each of the sections, each has the same number of ampere turns (NI). Assuming that the polarity of the fields generated by the sections 158 and 160 is positive or north seeking, the magnetic field generated by the section 162 is negative or south seeking.

FIG. 18 is a graphical explanation of the operation of the FPS system in the non-rotating mode. This figure shows the path of the electron beam in an $x$—$y$ plane looking into the tube from the target end, along the $z$ axis. The point A at the origin of the $x$—$y$ coordinates represents the object aperture of the FPS system from which the beam originates. The electrostatic field E generated for the system is directed along the positive $y$ axis. If no magnetic field were generated the beam would be deflected along the positive $y$ axis. In the mixed field condition of the FPS system, operating in the rotating mode, the beam follows a cycloidal path ABD. However, when the FPS system operates in the non-rotating mode, the beam follows the cycloidal path AB while it travels through the sections 158 and 160. At point B the beam enters into an opposing magnetic field generated by section 162 which changes its sense of rotation. The beam now follows a trochoidal path from point B to C. The trochoidal turns in a counterclockwise direction so that the beam returns to the $y$ axis, making it appear to have been deflected along the $y$ axis without any rotation.

The length of the deflection AC for FPS system operating in the non-rotating mode has been found to be around 27% greater than the length of deflection AD for an FPS system operating in the rotating mode. This indicates that the non-rotating mode has a greater deflection sensitivity than does the rotating mode. The non-rotating mode has been found to produce a larger scanning spot from an object aperture of a given size than does the rotating mode of operation, while having resolutioned power at least as good as that of the rotating mode.

The reversal in polarity of the field between the sections 160 and 162 causes a discontinuity in the field therebetween. Where a proper focus is to be obtained in an FPS system of a given length, a stronger magnetic field is required with the non-rotating mode of operation than with the rotating mode.

This invention is not limited to the particular details of the preferred embodiments illustrated, and it is contemplated that various modifications and applications will occur to those skilled in the art. It is therefore intended that the appended claims cover such modifications which do not depart from the direct spirit and scope of this invention.

What is claimed as new and desired to be secured by Letters Patent of the United States is:

1. An electron optical system for focusing and deflecting an electron beam comprising:
 (a) an envelope structure;
 (b) magnetic field means for generating a substantially uniform magnetic field within and along an axis of said envelope;

(c) electric field means for generating a variable, substantially uniform electric field within said envelope which can cause deflection of the beam along two coordinates of said system, said electric field being generated orthogonal to said magnetic field;

(d) an electron beam source positioned in said envelope, said source comprising means for directing a beam of electrons through said fields and means for forming the object of said electron optical system;

(e) a target positioned in said envelope opposite said electron beam source; and (f) said magnetic field means and said electric field means causing said magnetic and electric fields to cross within said envelope to form a focus projection and scanning cavity which simultaneously projects a focused image of said system object upon said target and scans it across the surface of said target.

2. The electron optical system according to claim 1 which is adjusted so that the transit time of the electrons across said cavity causes a dwell phase angle of the beam equal to or less than 180°.

3. The electron optical system according to claim 1 which is adjusted so that the transit time of the electrons across said cavity causes a dwell phase angle of the beam to have an approximate value between 110° and 140°.

4. The electron optical system according to claim 1 which is adjusted so that the transit time of the electrons across said cavity causes a dwell phase angle of the beam equal to or greater than 180°.

5. The electron optical system according to claim 1 which is adjusted so that the transit time of the electrons across said cavity causes a dwell phase angle of the beam to approximately equal 360°.

6. The electron optical system according to claim 1 which is adjusted so that the transit time of the electrons across said cavity causes a dwell phase angle of about the beam in the range of 270° to about 360°.

7. An electron optical system of claim 1 which includes a drift space between said beam source and said cavity.

8. The electron optical system of claim 7 in which the length of said drift space is in the approximate range of from .1 to .5 times the length of said cavity.

9. The electron optical system according to claim 1 in which a pre-focus lens is interposed between said source and said cavity, said lens being energized to control the angle of convergence or divergence of the electron beam entering said cavity in said envelope.

10. The electron optical system of claim 1 in which said means for generating a substantially uniform magnetic field comprises a solenoid surrounding said cavity.

11. The electron optical system according to claim 1 in which said means for generating said electric field comprises an electrostatic yoke surrounding said cavity.

12. The electron optical system according to claim 11 in which the shape of said yoke is a truncated cone.

13. The electron optical system of claim 11 in which said yoke including electrode leaves of a sinusoidal configuration having a pitch which is graded in accordance with the proximity of the beam to the walls of said yoke.

14. The electron optical system of claim 11 in which said yoke includes electrode leaves of a sinusoidal configuration which is graded in such a manner that electron beam enters said yoke in a path substantially orthogonal to the first cycle of said electrode leaves.

15. The electron optical system of claim 1 which includes collimation means for affecting the path of the beam between said cavity and said target.

16. The electron optical system of claim 15 in which said collimation means is magnetic.

17. The electron optical system of claim 15 in which said collimation means is electrostatic.

18. The electron optical system of claim 1 which includes electron beam accelerating means active at the boundaries of the space between said cavity and said target.

19. The electron optical system of claim 1 which includes electron beam decelerating means active at the boundaries of the space between said cavity and said target.

20. The electron optical system of claim 1 wherein said electron beam source includes a defining aperture which forms said system object.

21. An electron optical system for focusing and deflecting an electron beam comprising:

(a) an envelope structure;

(b) non-rotating magnetic lens means for generating a magnetic field within and along the axis of said envelope;

(c) electric field means for generating a time variable, substantially uniform electric field within said envelope which can cause deflection of the beam along two coordinates of said system, said electric field being generated orthogonal to said magnetic field;

(d) an electron beam source positioned in said envelope, said source comprising means for directing a beam of electrons through said fields and means for forming the object of said electron optical system;

(e) a target positioned in said envelope opposite the electron beam source; and (f) said non-rotating magnetic lens means and said electric field means causing said magnetic and electric fields to cross within said envelope, thereby forming a focus projection and scanning cavity which simultaneously projects a focused image of said system object upon said target and scans it across the surface of said target.

22. The electron optical system of claim 21 in which said non-rotating magnetic lens comprises two sections which generate magnetic fields opposite in polarity to each other.

23. An electron optical system for focusing and deflecting an electron beam comprising:

(a) an envelope;

(b) an electron beam source positioned at one end of said envelope, said source comprising means for directing a beam of electrons through a portion of said envelope and means for forming the object of said electron optical system;

(c) a target positioned in a plane perpendicular to the axis of said envelope at the end of said envelope opposite said electron beam source;

(d) means for generating a focus projection and scanning cavity within said envelope for focusing a projected image of said system object upon said target and scanning it across the surface of said target;

(e) the last mentioned means including solenoid means surrounding said cavity for generating a substantially uniform magnetic field within said cavity and parallel to the axis of said envelope;

(f) said last mentioned means also including an electrostatic yoke positioned within said envelope for generating a time variable, substantially uniform electric field within said envelope which can cause deflection of the beam along two coordinates of said system, said electric field being generated so that it crosses said magnetic field within said cavity transverse to said magnetic field.

24. The electron optical system of claim 23 in which an electrostatic pre-focus lens is interposed between said system object and said cavity, said lens being energized to control the angle of divergence or convergence of the electron beam entering said cavity.

25. The electron optical system of claim 23 wherein said electron beam source includes a defining aperture which forms said system object.

26. The electron optical system of claim 23 in which said yoke includes electrode leaves of a sinusoidal configuration having a pitch which is graded in accordance with the proximity of the beam to the walls of said yoke.

27. The electron optical system according to claim 23 which is adjusted so that the transit time of the electrons across said cavity causes a dwell phase angle of the beam having a value approximately between 110° and 140°.

28. The electron optical system according to claim 23 which is adjusted so that the transit time of the electrons across said cavity causes a dwell phase angle of the beam approximately equal to 360°.

29. The electron optical system according to claim 23 which is so adjusted that the transit time of the electrons across said cavity causes a dwell phase angle of about the beam in the range of 270° to about 360°.

30. The electron optical system according to claim 23 wherein said solenoid means forms a non-rotating magnetic lens which generates said magnetic field.

31. An electron optical system for focusing and deflecting an electron beam comprising:
(a) an envelope;
(b) means for generating a substantially uniform magnetic field parallel to the axis of said envelope and within the central portion of said envelope;
(c) means for generating a rotatably variable, substantially uniform biaxial, electric field within said central portion of said envelope coextensive with and orthogonal to said magnetic field;
(d) means including a defining aperture spaced from said central portion of said envelope for generating and projecting an electron beam into said central portion and focusing said beam at a point within said central portion; and
(e) a target positioned in a plane perpendicular to the axis of said envelope at the end of said envelope opposite said defining aperture and spaced from said central portion of said envelope, said focus point within said central portion being projected onto said target and scanned across the surface of said target through the action of said electric and magnetic fields.

32. The electron optical system of claim 31 wherein said means including a defining aperture generates and projects an electron beam at a predetermined converging half angle into said central portion for converging said electron beam from said central portion toward said target at a half angle substantially equal to said predetermined half angle.

33. The electron optical system of claim 31 wherein said means including a defining aperture generates and projects an electron beam into said central portion at a predetermined diverging half angle for converging said electron beam from said central portion toward said target at a half angle substantially equal to said predetermined half angle.

34. The invention as recited in claim 18 wherein said acceleration and deceleration means is a spiral electrode lens between said cavity and said target for the passage of electrons axially therethrough.

35. The invention as recited in claim 34 wherein each said spiral is a cylindrical spiral, and a transverse mesh electrode is positioned at the end of said cylindrical spiral remote from said target.

References Cited by the Examiner

UNITED STATES PATENTS 2,652,515   9/1953   McGee _____ 315—15 X

OTHER REFERENCES

Schlesinger: "Progress in the Development of Post Acceleration and Electrostatic Deflection," Proceedings of IRE, vol. 44, May 1956, page 659.

DAVID G. REDINBAUGH, *Primary Examiner.*

T. A. GALLAGHER, *Assistant Examiner.*